US012744662B2

(12) United States Patent
Rahn et al.

(10) Patent No.: US 12,744,662 B2
(45) Date of Patent: Sep. 22, 2026

(54) SERIAL NUMBER GENERATION FOR STATELESS CLOUD CERTIFICATE AUTHORITY

(71) Applicant: SAP SE, Walldorf (DE)

(72) Inventors: Marc Rahn, Mannheim (DE); Nils Neumann, Leimen (DE); Moritz Falke, Leimen (DE)

(73) Assignee: SAP SE, Walldorf (DE)

( * ) Notice: Subject to any disclaimer, the term of this patent is extended or adjusted under 35 U.S.C. 154(b) by 197 days.

(21) Appl. No.: 18/810,919

(22) Filed: Aug. 21, 2024

(65) Prior Publication Data

US 2026/0058797 A1 Feb. 26, 2026

(51) Int. Cl.
*H04L 9/08* (2006.01)
*H04L 9/32* (2006.01)

(52) U.S. Cl.
CPC .......... *H04L 9/0825* (2013.01); *H04L 9/3268* (2013.01)

(58) Field of Classification Search
CPC ..... H04L 9/0825; H04L 9/3268; H04L 9/006; H04L 9/3297
See application file for complete search history.

(56) References Cited

U.S. PATENT DOCUMENTS 11,018,873 B1 * 5/2021 Winarski ................ H04L 9/002
12,316,782 B2 * 5/2025 Hess, III ............... H04L 9/3268
2005/0021941 A1 * 1/2005 Ohmori ................ H04L 9/0891 713/156
2021/0099309 A1 * 4/2021 Winarski ............ H04L 67/1097

* cited by examiner

*Primary Examiner* — Phy Anh T Vu
(74) *Attorney, Agent, or Firm* — Buckley, Maschoff & Talwalkar LLC

(57) ABSTRACT

A system associated with a public key infrastructure certificate framework in a cloud computing environment may include a certificate authority data store that contains information about a plurality of certificate authority instances (with each certificate authority instance being associated with an instance index and an instance deployment time). A certificate authority server, coupled to the certificate authority data store, may retrieve an instance index and instance deployment time from the certificate authority data store. The certificate authority server may then determine a current certificate identifier generation timestamp. A unique certificate identifier for a public key certificate is generated by the certificate authority server based on a deterministic creation algorithm, the instance index, the instance deployment time, and the certificate identifier generation timestamp. The public key certificate can then be issued using the unique certificate identifier.

10 Claims, 13 Drawing Sheets

1100

| PKI CERTIFICATE REQUEST IDENTIFIER 1102 | INSTANT INDEX 1104 | DEPLOY TIME 1106 | GENERATION TIMESTAMP 1108 | COUNTER 1110 | SERIAL NUMBER 1112 |
|---|---|---|---|---|---|
| R_101 | | | | | |
| R_102 | | | | | |
| R_103 | | | | | |
| R_104 | | | | | |

*FIG. 11*

SERIAL NUMBER GENERATION FOR STATELESS CLOUD CERTIFICATE AUTHORITY

BACKGROUND

An enterprise may utilize a Public Key Infrastructure ("PKI") to create, manage, distribute, use, and store digital certificates and manage public-key encryption. The PKI may facilitate the secure electronic transfer of information for a range of network activities such as e-commerce, internet banking, and other confidential communications. The PKI binds public keys with respective identities of entities through a process of certificate registration and issuance by a Certificate Authority ("CA"). The X.509 protocol is an International Telecommunication Union ("ITU") standard defining the format of public key certificates, such as those used in the Transport Layer Security (TLS"), Secure Socket Layer ("SSL"), and Hyper-Text Transfer Protocol-Secure ("HTTPS") for browsing the web. The creation of a certificate (e.g., public key certificate) requires the generation of a unique identifier, or serial number, for each key.

FIG. 1 is a traditional system 100 in which a PKI certificate framework 150 issues a public key certificate 170 in response to a PKI certificate request. The most common solution for generating unique serial numbers for the certificates 170 has been the use of a random number generator 160. The probability of generating the same random number twice is low, especially when the space of possible numbers is large. However, even though the chance of collision is low, it is not zero. This approach, therefore, does not completely eliminate the risk of generating duplicate serial numbers, which violates the X.509 PKI certificate standard. To mitigate this risk, The PKI certificate framework 150 may utilize a database 110 to track all prior serial number that have already been issued. Upon generating a new serial number, the framework 150 checks the database 110 to ensure that the new number has not been previously issued. If a collision is detected, the process is repeated until a unique serial number is generated. This method, however, introduces additional complexity and overhead because the database 110 must be constantly updated and maintained. Moreover, in the context of highly scalable and stateless cloud certificate authorities, this approach becomes less feasible due to the high volume of requests and the inherent latency of database operations.

It would therefore be desirable to provide a certificate authority server within a PKI framework in a secure, automatic, and efficient manner.

SUMMARY

According to some embodiments, methods and systems associated with a public key infrastructure certificate framework may include a certificate authority data store that contains information about a plurality of certificate authority instances (with each certificate authority instance being associated with an instance index and an instance deployment time). A certificate authority server, coupled to the certificate authority data store, may retrieve an instance index and instance deployment time from the certificate authority data store. The certificate authority server may then determine a current certificate identifier generation timestamp. A unique certificate identifier for a public key certificate is generated by the certificate authority server based on a deterministic creation algorithm, the instance index, the instance deployment time, and the certificate identifier generation timestamp. The public key certificate can then be issued using the unique certificate identifier.

Some embodiments comprise: means for retrieving, by a computer processor of a certificate authority server, an instance index and instance deployment time from the certificate authority data store that contains information about a plurality of certificate authority instances, each certificate authority instance being associated with an instance index and an instance deployment time; means for determining a current certificate identifier generation timestamp; means for creating a unique certificate identifier for a public key certificate based on a deterministic creation algorithm, the instance index, the instance deployment time, and the certificate identifier generation timestamp; and means for issuing the public key certificate using the unique certificate identifier.

Some technical advantages of some embodiments disclosed herein are improved systems and methods to provide a certificate authority server within a PKI framework in a secure, automatic, and efficient manner.

BRIEF DESCRIPTION OF THE DRAWINGS

FIG. 11 is a portion of a PKI certificate request database in accordance with some embodiments.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers'specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
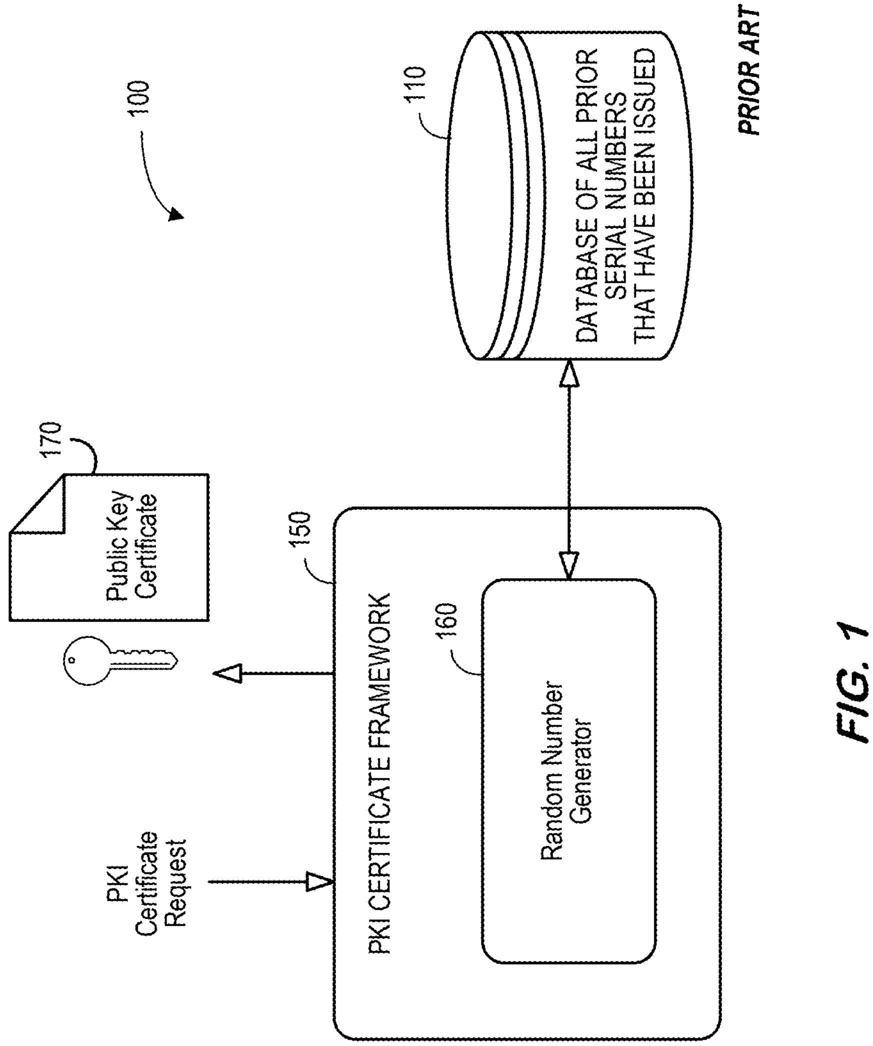
FIG. 1 is a traditional PKI certificate system.
Figure 2:
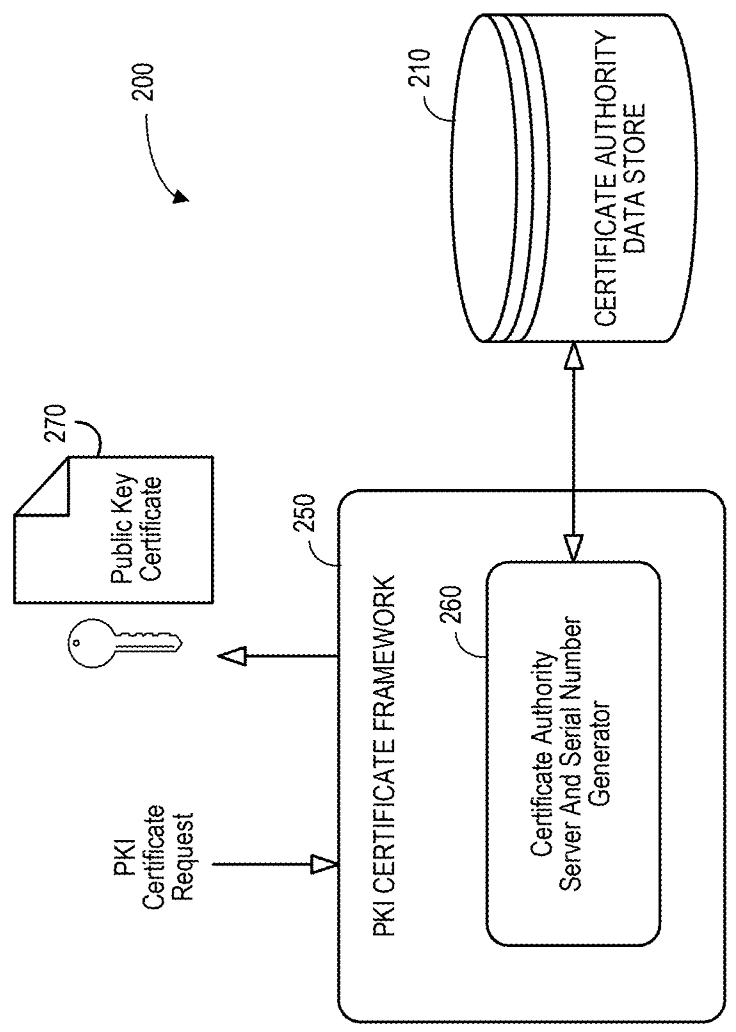
FIG. 2 is a high-level PKI certificate system architecture in accordance with some embodiments.
Figure 3:
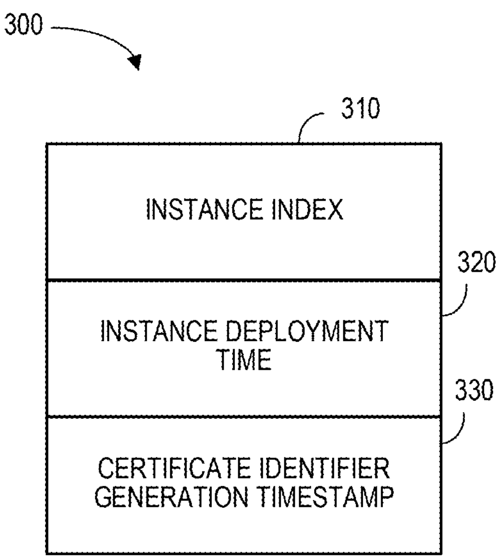
FIG. 3 is a certificate identifier according to some embodiments.

Using a database to ensure the uniqueness of random generated identifiers is not feasible when running highly scalable and stateless cloud certificate authorities. Thus, some embodiments described herein create unique identifiers without the need for databases and random number generators. For example, FIG. 2 is a high-level block diagram of one example of a PKI certificate system 200 architecture according to some embodiments. In particular, a certificate authority server 250 may access information about a plurality of certificate authority instances (e.g., each certificate authority instance may be associated with an instance index and instance deployment time) from a certificate authority data store 210. The certificate authority server 250 may then use instance index and instance deployment time to create a public key certificate 270 in response to a PKI certificate request. In particular, a certificate authority server and serial number generator 260 may create a unique identifier for the public key certificate 270. For example, FIG. 3 is a certificate identifier 300 according to some embodiments. The identifier 300 includes an instance index 310, an instance deployment time 320, and a certificate identifier generation timestamp 330. According to some embodiments, a remote operator or administrator device may be used to configure or otherwise adjust the system 200.

As used herein, devices, including those associated with the system 200 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

Referring again to FIG. 2, the certificate authority server 250 may store information into and/or retrieve information from various data stores (e.g., the certificate authority data store 210), which may be locally stored or reside remote from the certificate authority server 250. Although a single certificate authority server 250 is shown in FIG. 2, any number of such devices may be included. Moreover, various devices described herein might be combined according to embodiments of the present invention. For example, in some embodiments, the certificate authority data store 210 and the certificate authority server 250 might comprise a single apparatus. The system 200 functions may be performed by a constellation of networked apparatuses, such as in a distributed processing or cloud-based architecture. In some cases, the certificate authority server 250 may process information associated with a number of different enterprises. Moreover, note that the certificate authority data store 210 might only be needed to later recalculate a serial number at some verification time (e.g., to determine the instance index, deployment time, etc.). Otherwise, the instance index and deployment time could be stored in-memory of the certificate authority server 250 (removing the need for a stateful certificate authority data store 210). As used herein, the "phrase certificate authority data store" could also include a strictly in-memory implementation.

An enterprise may access the system 200 via a remote device (e.g., a Personal Computer ("PC"), tablet, or smartphone) to view information about and/or manage operational information in accordance with any of the embodiments described herein. In some cases, an interactive Graphical User Interface ("GUI") display may let an operator or administrator define and/or adjust certain parameters via a remote device (e.g., to specify a serial number generator 260 format to be used for an enterprise computing environment infrastructure) and/or provide or receive automatically generated recommendations, alerts, summaries, or results associated with the system 200.

Figure 4:
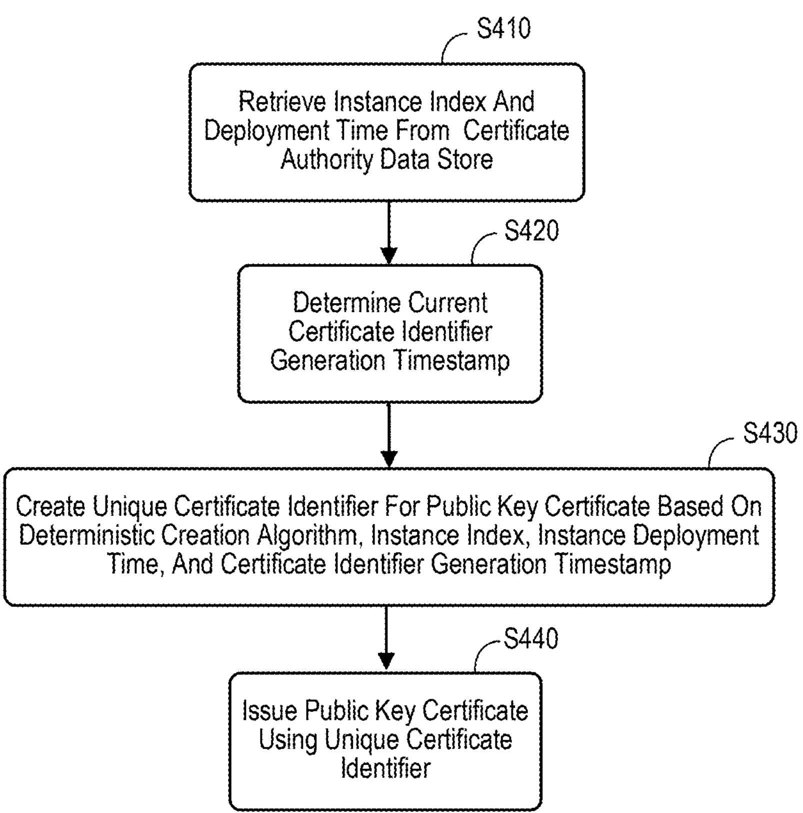
FIG. 4 is a certificate identifier method in accordance with some embodiments.

FIG. 4 is a method that might be performed by some or all of the elements of the system 200 described with respect to FIG. 2. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S410, a computer processor of a certificate authority server may retrieve an instance index and instance deployment time from a certificate authority data store. The certificate authority data store may, according to some embodiment, contain information about a plurality of certificate authority instances (with each certificate authority instance being associated with an instance index (e.g., a one-byte value) and an instance deployment time (e.g., an eight-byte value)).

At S420, the system may determine a current certificate identifier generation timestamp (e.g., an eight-byte value). The certificate identifier generation timestamp may comprise, for example, a monotonically increasing value. At S430, the system creates a unique certificate identifier (e.g., a twenty-byte Request For Comment ("RFC") 5280 value associated with an X.509 public key certificate) based on a deterministic creation algorithm, the instance index, the instance deployment time, and the certificate identifier generation timestamp. The public key certificate is then issued at S440 using the unique certificate identifier.

According to some embodiments, the certificate authority server is further to determine a certificate identifier generation counter (e.g., a two-byte value). The certificate identifier generation counter may be, for example, created via a counter mutex that checks whether the last public key certificate issued by the certificate authority server had an identical certificate identifier generation timestamp. The deterministic creation algorithm of S430 might comprise, for example, concatenating:

a. a Leading Zero Byte,
b. the instance index,
c. the instance deployment time,
d. the certificate identifier generation timestamp, and
e. the certificate identifier generation counter.

According to some embodiments, the certificate authority server is associated with a cloud-based PKI certification service. Moreover, the certification service may be part of an integration suite for data, application, and application Programming Interface ("API") integration.

Figure 5:
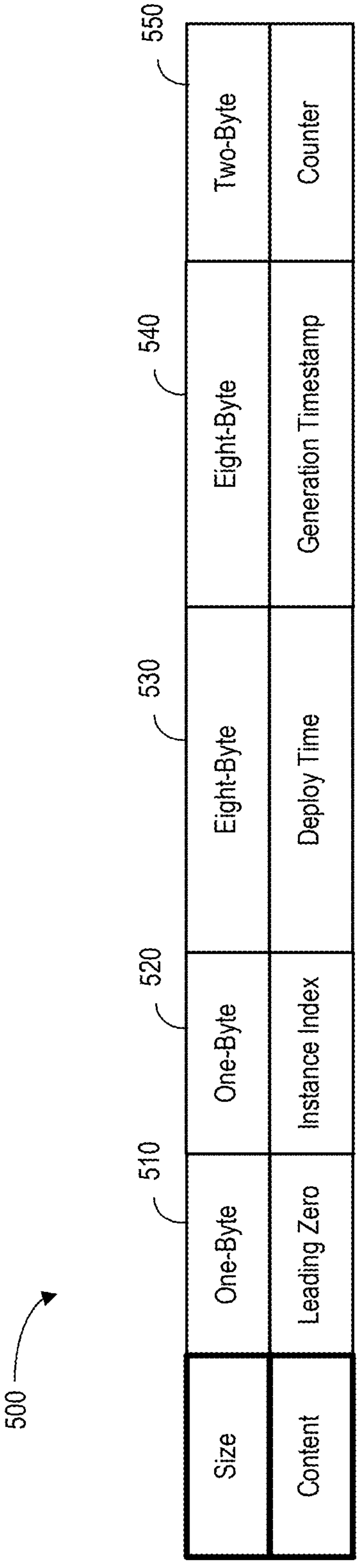
FIG. 5 is a detailed certificate serial number according to some embodiments.

Assuming that the upper limit for serial numbers is 20 octets (as described in RFC 5280), generating a unique identifier can be done as follows:

FIG. 5 is a detailed certificate serial number 500 according to some embodiments. A one-byte leading zero 510 may ensure that the serial number 500 is a non-negative value (per the protocol). The leading zero 510 is followed by a one-byte instance index 520. Next, an eight-byte deploy time 530 is followed by an eight-byte generation timestamp 540. Finally, the serial number 500 ends with a two-byte counter 550. Thus, the overall certificate serial number 500 comprises a twenty-byte (or "octet") value. A PKI certificate request is received by a certificate authority (e.g., from a client).

Start with a zero byte to always make the identifier a positive integer.

Use a single-byte value for the instance index of the multi-instanced cloud certificate authority.

Use an eight-byte value for the deploy time of the multi-instanced cloud certificate authority.

Use an eight-byte value for the timestamp indicating when the identifier was issued.

Use a two-byte value for a counter to prevent collisions when issuing multiple identifiers at the same timestamp.

Figure 6:
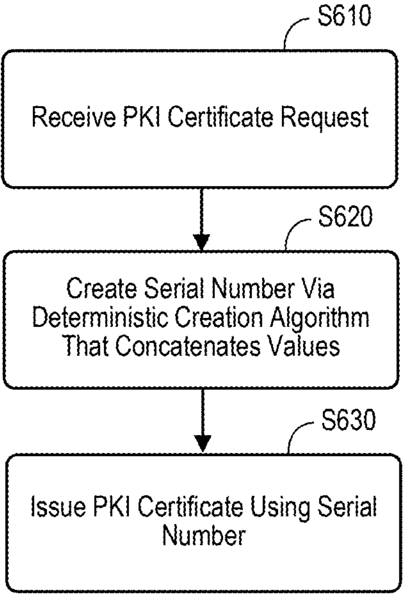
FIG. 6 is a more detailed certificate serial number method in accordance with some embodiments.

Following the above identifier structure, each part can be implemented as described in more detail as follows:

FIG. 6 is a more detailed certificate serial number method in accordance with some embodiments. At S610, a PKI certificate request is received. For example, a certificate authority may receive a Certificate Signing Request ("CSR") from a client. At S620, the system creates a unique serial number via a deterministic creation algorithm that concatenates values in accordance with any of the embodiments described herein. A PKI certificate can then be issued using that serial number at S630. For example, an X.509 public key certificate may be transmitted to the client who submitted the CSR.

Figure 7:
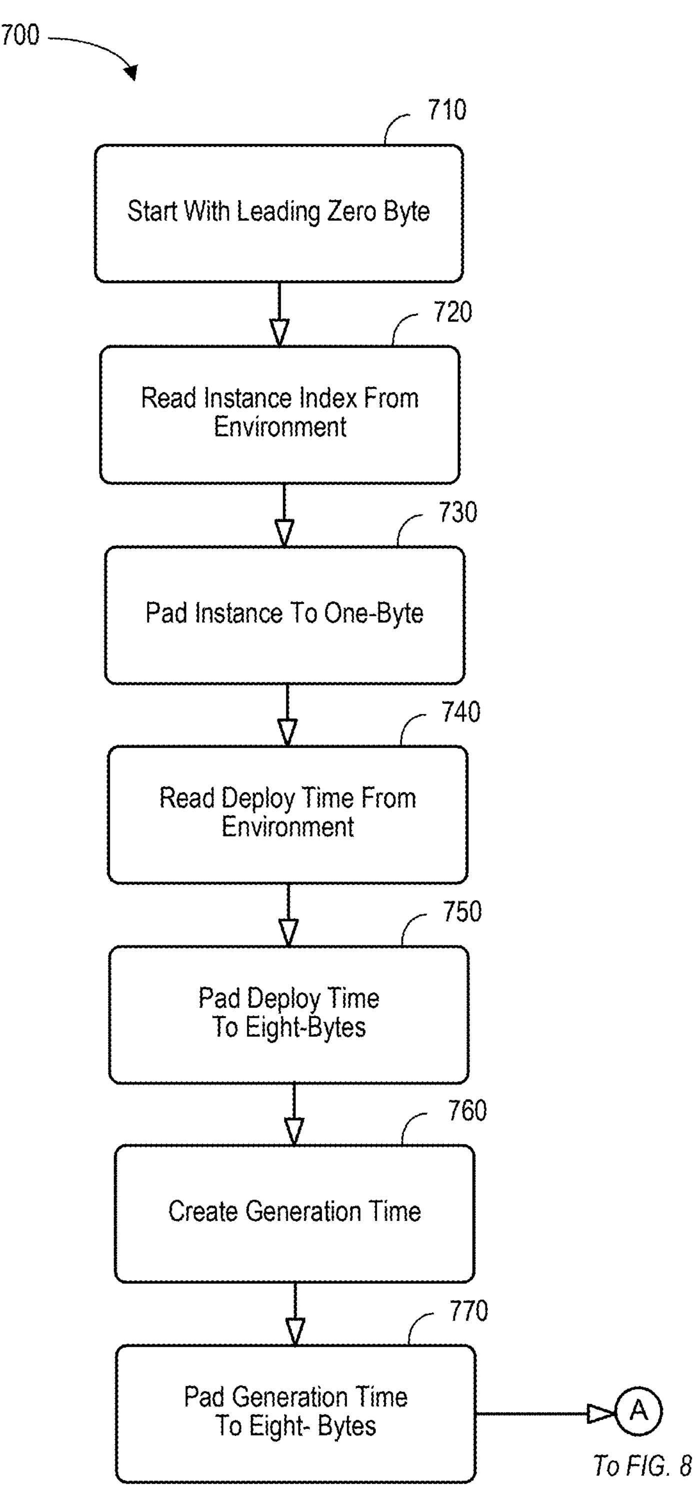
FIG. 7 is a cloud certificate authority information flow according to some embodiments.

FIG. 7 is a cloud certificate authority information flow 700 according to some embodiments. RFC 5280 requires certificate authorities to force the serial number to be a non-negative integer. Thus, the identifier starts with a leading zero byte at 710 to make sure that the complete identifier is interpreted as a positive integer. This is needed as the instance index might be any number and signed integers use the first bit to show if the integer is positive or negative. In some embodiments, only a single leading zero bit might be inserted at 710.

The next byte is for the instance index read from the environment at 720. This might be needed, for example, when a multi-instance cloud certificate authority runs on multiple instances (e.g., to ensure high availability). This can result in a scenario where multiple instances create a serial number at the same point in time. Distinguishing between instances by their instance number will make the identifier unique between instances even in this situation. At 730, the instance is padded to one-byte.

In highly available cloud scenarios, zero-downtime services might be deployed using a "blue/green" approach in which two separate, but identical environments are created. One environment (blue) runs the current application version and one environment (green) runs the new application version. This results in the case that there are multiple instances with the same instance index (that is, the blue and green instance) of the same cloud certificate authority. Introducing the deployment time of the cloud certificate authority application from the environment at 740 leads to collision-free instance indexes (as each application is deployed at a different time). This deploy time is padded to the following eight-bytes at 750.

To create a unique identifier, the generation time indicating when the serial number is created is determined at 760. The generation time might comprise, for example, a strictly monotonically increasing value. This ensures that at a given point in time, the system will generate a unique identifier that is different from any other identifier. This value is padded to eight-bytes at 770.

Figure 8:
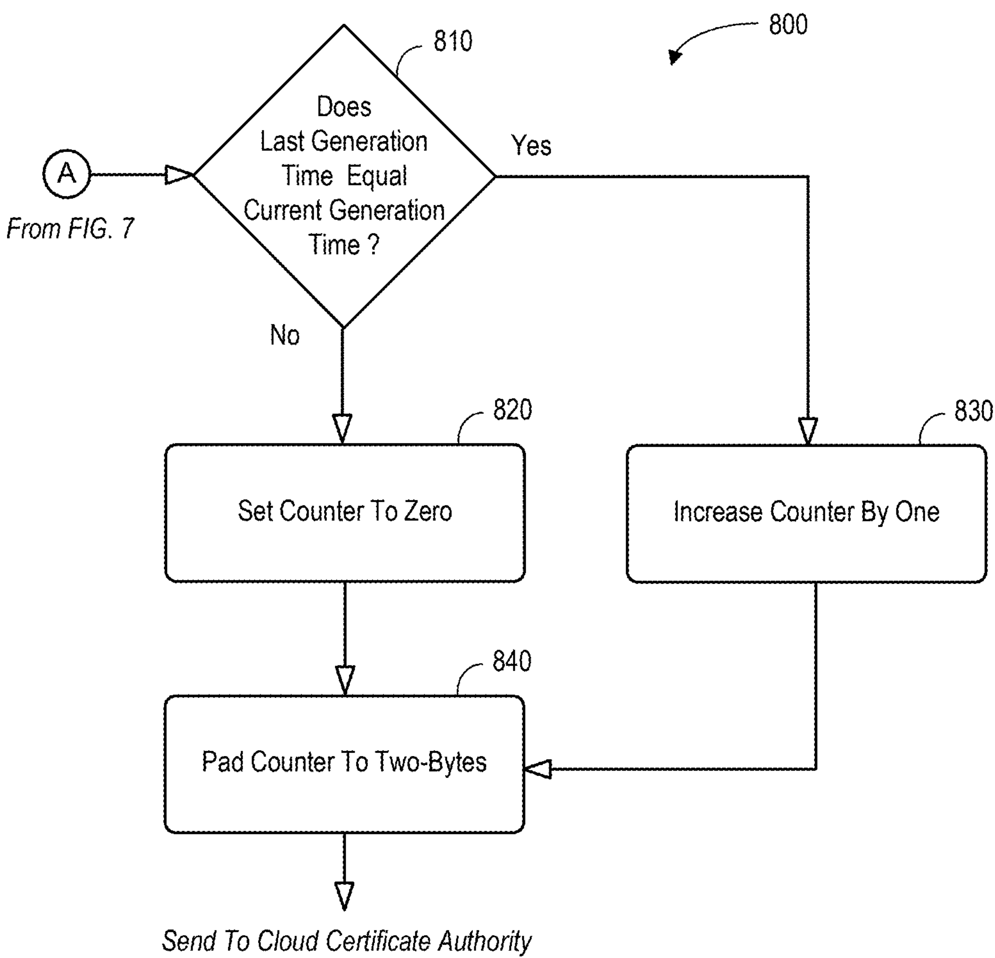
FIG. 8 is a counter mutex information flow in accordance with some embodiments.

Another thing to consider when creating a unique identifier is that a single instance of a cloud certificate service might simultaneously handle multiple requests. This can result in multiple identifiers being created at the same generation time. To avoid collisions when multiple identifiers have the same generation time, a unique counter is introduced. For example, the process may continue in FIG. 8, which is a counter "mutex" information flow 800 in accordance with some embodiments. As used herein, the term "mutex" (from "mutual exclusion") may refer to a synchronization primitive that prevents state from being modified or accessed by multiple threads of execution at once. When the generation time is the same between the multiple identifiers this counter ensures uniqueness. If the generation time of the last creation time 810 is not equal to the current generation time at 810, the counter is set to zero at 820. Otherwise, the counter is increased by one at 830. This counter is padded to two-bytes at 840 and sent to the cloud certificate authority which can then combine all of the relevant values to create a unique serial number.

Figure 9:
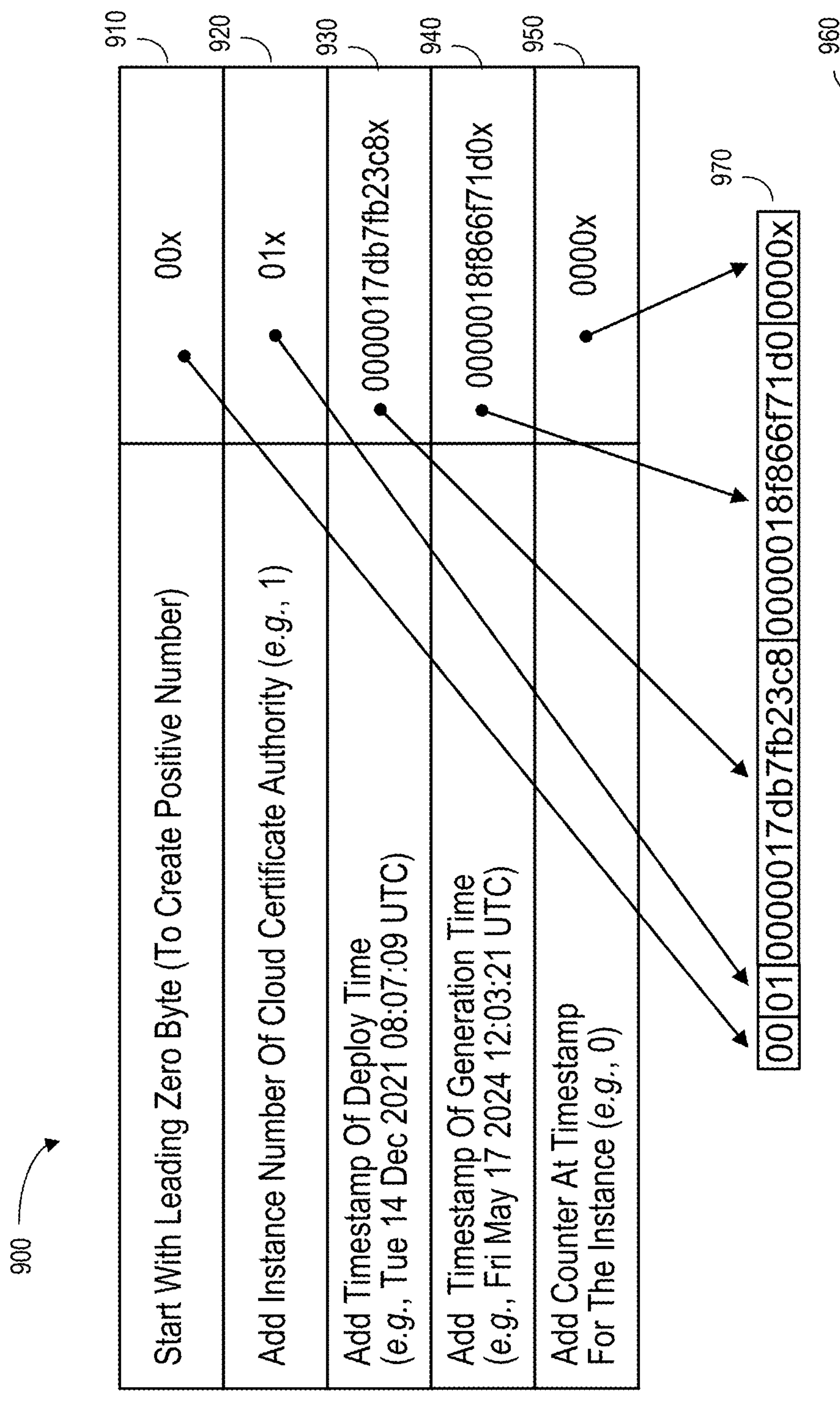
FIG. 9 is an example of certificate serial number creation according to some embodiments.

To clarify the above process, consider FIG. 9 which is an example 900 of certificate serial number creation where all numbers are represented as hexadecimal values and are padded to the required length with leading zeros. The example 900 starts with a leading zero byte (to create a positive number) at 910: "00x." The instance number of the cloud certificate authority (e.g., 1) is then added at 920: "01x." Next, the timestamp of the deploy time (e.g., Tuesday 14 Dec. 2021 08:07:09 UTC) is added at 930: "0000017db7fb23c8x." Similarly, the generation timestamp (e.g., Friday May 17 2024 12:03:21 UTC) is added: "0000018f866f71d0x." Finally, the counter at this timestamp for this instance (e.g., 0) is added at 950: "0000x." Concatenating these values follows a pre-determined pattern 960:

<leading zero byte><instance index><deploy time><generation time><counter> and creates the unique identifier 970:

"00010000017db7fb23c80000018f866f71d00000x."

The limits of this algorithm may be given by the limits of the different fixed-length parts of the serial number. For example, because the "instance index" is limited to one-byte, there can only be 256 different instances of the same certificate authority at any given time. This limits the scalability of the certificate authority, but 256 instances represents a fairly large upper limit. Because the counter is limited to two-bytes, there can only be 65536 uniquely generated serial numbers per certificate authority (identified by the Instance Index and "Deploy Time") at the current timestamp (generation time). This is also a fairly high number because the eight-byte generation time can fit a timestamp to within one millisecond. This means that the limitation of 65536 uniquely generated serial numbers refers to a single millisecond and certificate authority instance. In contrast, other solutions such as using a random serial number, do not have such a "tight" restriction in the number of serial numbers generated (that is, they can use all twenty-bytes).

Figure 10:
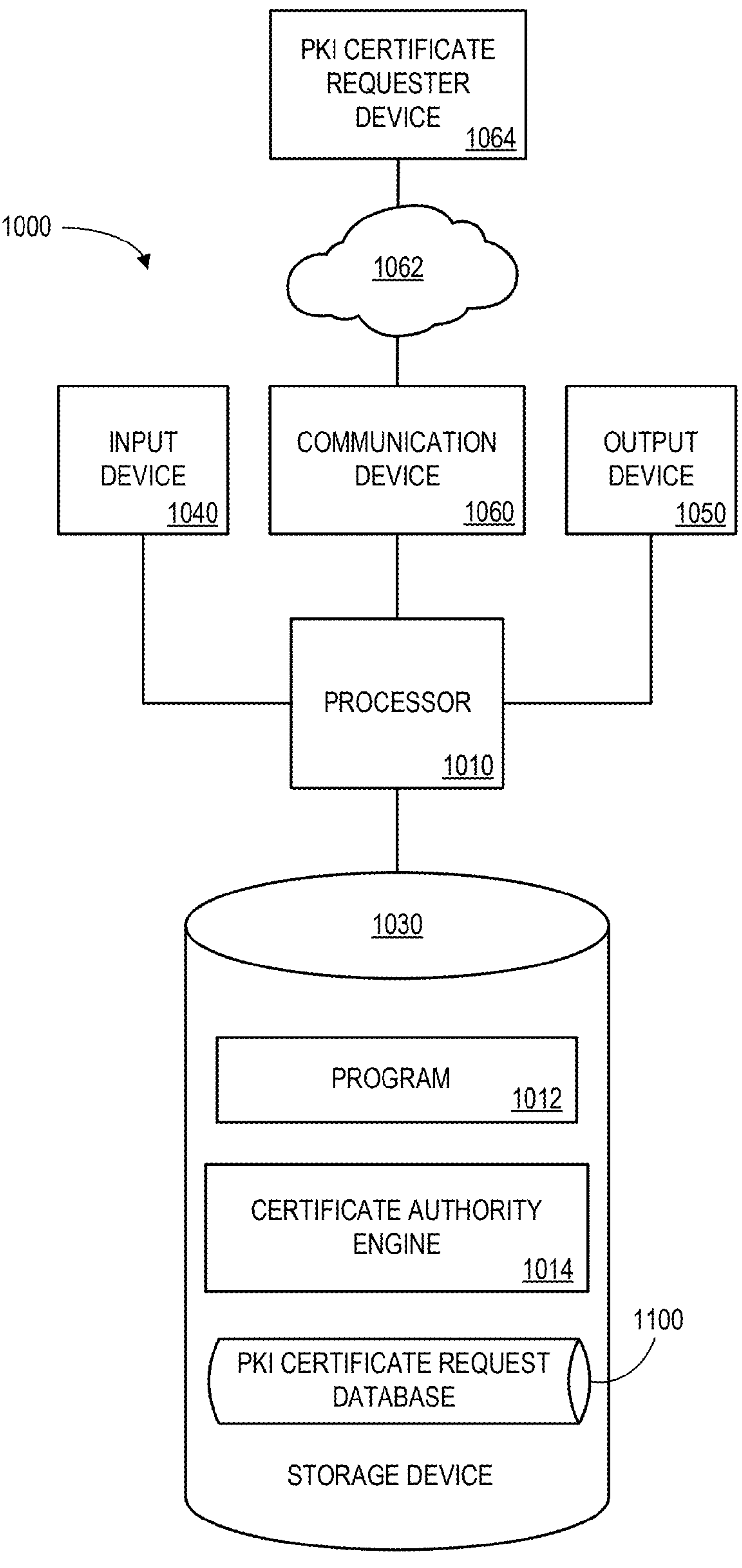
FIG. 10 is an apparatus or platform according to some embodiments.

Note that the embodiments described herein may be implemented using any number of different hardware configurations. For example, FIG. 10 is a block diagram of an apparatus or platform 1000 that may be, for example, associated with the system 200 of FIG. 2 (and/or any other system described herein). The platform 1000 comprises a processor 1010, such as one or more commercially available Central Processing Units ("CPUs") in the form of one-chip microprocessors, coupled to a communication device 1060 configured to communicate via a communication network 1062. The communication device 1060 may be used to communicate, for example, with one or more PKI certificate requestor devices 1064 via a distributed computer network 1062. The platform 1000 further includes an input device 1040 (e.g., a computer mouse and/or keyboard to input data mappings, cloud configurations, etc.) and/an output device 1050 (e.g., a computer monitor to render a display, transmit recommendations, charts, alerts, and/or reports about a PKI certificate framework or service, etc.).

The processor 1010 also communicates with a storage device 1030. The storage device 1030 may comprise any appropriate information storage device, including combinations of magnetic storage devices (e.g., a hard disk drive), optical storage devices, mobile telephones, and/or semiconductor memory devices. The storage device 1030 stores a program 1012 and/or certificate authority engine 1014 for controlling the processor 1010. The processor 1010 performs instructions of the programs 1012, 1014, and thereby operates in accordance with any of the embodiments described herein. For example, the processor 1010 may retrieve an instance index and instance deployment time from a certificate authority data store. The processor 1010 may then determine a current certificate identifier generation timestamp. A unique certificate identifier for a public key certificate is generated by the processor 1010 based on a deterministic creation algorithm, the instance index, the instance deployment time, and the certificate identifier generation timestamp. The public key certificate can then be issued using the unique certificate identifier.

The programs 1012, 1014 may be stored in a compressed, uncompiled and/or encrypted format. The programs 1012, 1014 may furthermore include other program elements, such as an operating system, clipboard application, a database management system, and/or device drivers used by the processor 1010 to interface with peripheral devices.

As used herein, information may be "received" by or "transmitted" to, for example: (i) the platform 1000 from another device; or (ii) a software application or module within the platform 1000 from another software application, module, or any other source.

In some embodiments (such as the one shown in FIG. 10), the storage device 1030 further stores a PKI certificate request database 1100. An example of a database that may be used in connection with the platform 1000 will now be described in detail with respect to FIG. 11. Note that the database described herein is only one example, and additional and/or different information may be stored therein. Moreover, various databases might be split or combined in accordance with any of the embodiments described herein.

Referring to FIG. 11, a table is shown that represents the PKI certificate request database 1100 that may be stored at the platform 1000 according to some embodiments. The table may include, for example, entries identifying collaborative models on which various users are working. The table may also define fields 1102, 1104, 1106, 1108, 1110, 1112 for each of the entries. The fields 1102, 1104, 1106, 1108, 1110, 1112 may, according to some embodiments, specify: a PKI certificate request identifier 1102, an instance index 1104, a deploy time 1106, a generation timestamp 1108, a counter 1110, and a serial number 1112. The PKI certificate request database 1100 may be created and updated, for example, when a new public key certificate is created.

The PKI certificate request identifier 1102 might be a unique alphanumeric label that is associated with a request for a PKI public key X.509 certificate. The instance index 1104 is a value representing a particular instance of a cloud authority in a multi-instance cloud computing environment and the deploy time 1106 indicates when the instance was deployed. The generation timestamp 1108 indicates a specific time when the unique identifier for the certificate is created, and the counter 1110 distinguishes between multiple identifiers that were created during a single generation timestamp 1108. The serial number 1112 may be based on the instance index 1104, deploy time 1106, generation timestamp 1108, and counter 1110 and represent the unique identifier used to create the PKI public key X. 509 certificate.

In this way, embodiments may provide a simple and scalable algorithm that does not need a database to guarantee uniqueness of the generated serial numbers. In addition, in terms of security and traceability, embodiments may have the advantage that one can always check the correctness of the serial number unlike a random number approach. In detail, at any given evaluation time, one can recalculate the expected serial number at the generation time (given that one knows the input configuration). This is due to the deterministic property of the algorithm and may allow for the detection of malicious serial numbers or potential attacks. The serial numbers may also be used for attestation. From the serial number, one can extract the time the certificate was generated, the deploy time of the certificate authority, or which instance of the certificate authority signed the certificate. Embodiments may reduce the potential for collisions that can sometimes occur with randomly generated identifiers, thereby enhancing the integrity and reliability of certificates issued by the cloud certificate authority. Moreover, embodiments may negate the necessity of maintaining and operating a database for serial number generation and management. This reduces overhead and resource allocation, making it more efficient and cost-effective. Furthermore, embodiments may reduce the risk of errors and complications that can arise from the operation and maintenance of a database. Embodiments may be compliant with RFC 5280 by making sure the serial number is a non-negative integer.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with some embodiments of the present invention (e.g., some of the information associated with the databases described herein may be combined or stored in external systems). Moreover, although some embodiments are focused on particular types of PKI certificate applications, any of the embodiments described herein could be applied to other types of public key certificate applications.

Figure 12:
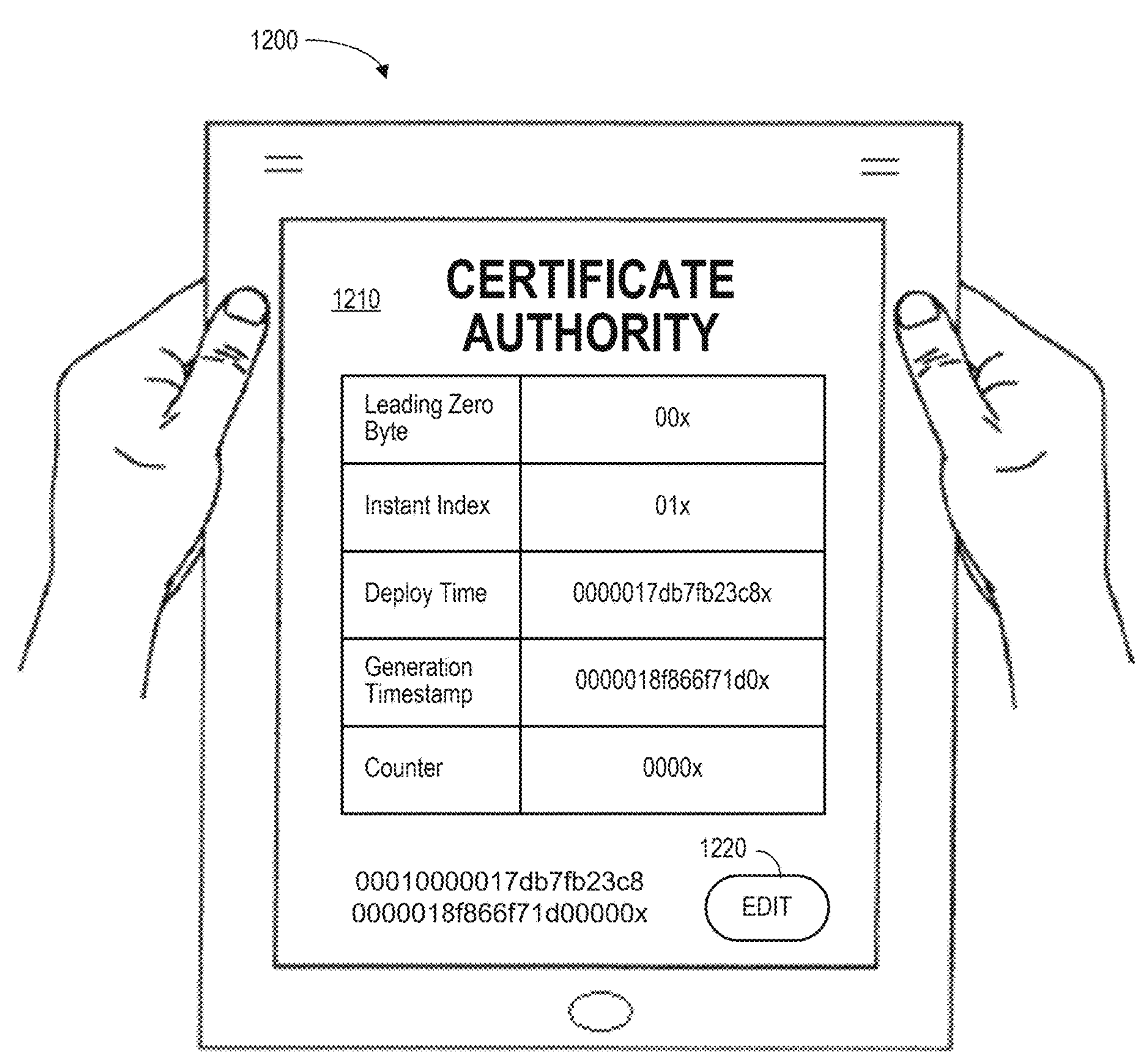
FIG. 12 illustrates a tablet computer certificate authority display according to some embodiments.

In addition, the displays shown herein are provided only as examples, and any other type of user interface could be implemented. For example, FIG. 12 illustrates a tablet computer 1200 providing a certificate authority display 1210 according to some embodiments. The certificate authority display 1210 might be used, for example, to troubleshoot certificate generation. A user may interact with the display 1210, such as by touching an element of the display 1210 and selecting an "Edit" icon 1220. In this way, the user may see more information about an element of the serial number.

Figure 13:
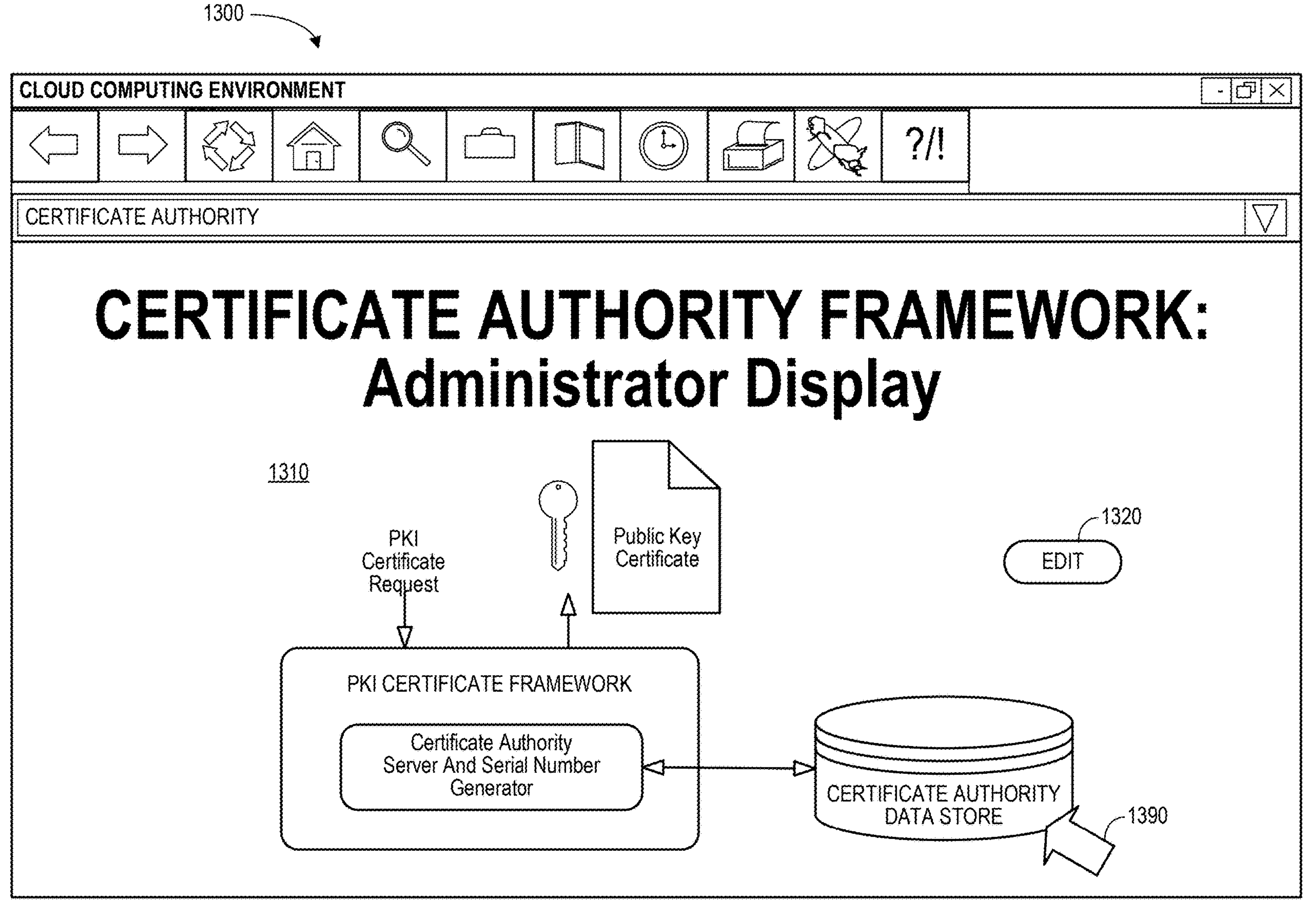
FIG. 13 is a certificate authority framework operator or administrator display in accordance with some embodiments.

FIG. 13 is an operator or administrator display 1300 in accordance with some embodiments. The display 1300 includes a graphical representation 1310 of a PKI certificate system in accordance with any of the embodiments described herein. Selection of an element on the display 1300 (e.g., via a touchscreen or computer pointer 1390) may result in display of a pop-up window containing more detailed information about that element and/or various options (e.g., to define how a certificate authority server interacts with clients or other elements of a public key infrastructure certificate framework, etc.). Selection of an "Edit" icon 1320 may also let an operator or administrator adjust the operation of the system (e.g., to change mapping to a data store, adjust cloud implementation properties, etc.).

The present invention has been described in terms of several embodiments solely for the purpose of illustration. Persons skilled in the art will recognize from this description that the invention is not limited to the embodiments described but may be practiced with modifications and alterations limited only by the spirit and scope of the appended claims.

The invention claimed is:

1. A system associated with a public key infrastructure certificate framework in a cloud computing environment, comprising:

a certificate authority data store that contains information about a plurality of certificate authority instances, each certificate authority instance being associated with an instance index and an instance deployment time; and a certificate authority server, coupled to the certificate authority data store, including:

a computer processor, and a computer memory storing instructions that when executed by the computer processor cause the certificate authority server to:

retrieve an instance index and instance deployment time from the certificate authority data store, determine a current certificate identifier generation timestamp, determine a certificate identifier generation counter, wherein the certificate identifier generation counter is created via a counter mutex that checks whether a last public key certificate issued by the certificate authority server had an identical certificate identifier generation timestamp;

create a unique certificate identifier for a public key certificate based on a deterministic creation algorithm, wherein the deterministic creation algorithm comprises concatenating leading zero, the instance index, the instance deployment time, the current certificate identifier generation timestamp, and the certificate identifier generation counter;

wherein the leading zero is a one-byte value, the instance index value is a one-byte value, the instance deployment time is an eight-byte value, the current certificate identifier generation timestamp is an eight-byte value, and the certificate identifier generation counter is a two-byte value, and issue the public key certificate using the unique certificate identifier.

2. The system of claim 1, wherein the certificate identifier generation timestamp is a monotonically increasing value.

3. The system of claim 1, wherein the unique certificate identifier is a twenty-byte Request For Comment ("RFC") 5280 value associated with an X.509 public key certificate.

4. The system of claim 1, wherein the certificate authority server is associated with a cloud-based Public Key Infrastructure ("PKI") certification service.

5. The system of claim 4, wherein the certification service is part of an integration suite for data, application, and application Programming Interface ("API") integration.

6. A computer-implemented method associated with a public key infrastructure certificate framework in a cloud computing environment, comprising:

retrieving, by a computer processor of a certificate authority server, an instance index and instance deployment time from a certificate authority data store that contains information about a plurality of certificate authority instances, each certificate authority instance being associated with an instance index and an instance deployment time;

determining a current certificate identifier generation timestamp;

determining a certificate identifier generation counter created via a counter mutex that checks whether a last public key certificate issued by the certificate authority server had an identical certificate identifier generation timestamp;

creating a unique certificate identifier for a public key certificate based on a deterministic creation algorithm, wherein the deterministic creation algorithm comprises concatenating leading zero, the instance index, the instance deployment time, the current certificate identifier generation timestamp, and the certificate identifier generation counter;

wherein the leading zero is a one-byte value, the instance index value is a one-byte value, the instance deployment time is an eight-byte value, the current certificate identifier generation timestamp is an eight-byte value, and the certificate identifier generation counter is a two-byte value, and issuing the public key certificate using the unique certificate identifier.

7. The method of claim 6, wherein the unique certificate identifier is a twenty-byte Request For Comment ("RFC") 5280 value associated with an X.509 public key certificate.

8. One or more non-transitory computer-readable media storing computer-executable instructions that, when executed by a computing system, cause the computing system to perform operations for a public key infrastructure certificate framework in a cloud computing environment, comprising:

retrieving, by a computer processor of a certificate authority server, an instance index and instance deployment time from a certificate authority data store that contains information about a plurality of certificate authority instances, each certificate authority instance being associated with an instance index and an instance deployment time;

determining a current certificate identifier generation timestamp;

determining a certificate identifier generation counter created via a counter mutex that checks whether a last public key certificate issued by the certificate authority server had an identical certificate identifier generation timestamp;

creating a unique certificate identifier for a public key certificate based on a deterministic creation algorithm, wherein the deterministic creation algorithm comprises concatenating leading zero, the instance index, the instance deployment time, current the certificate identifier generation timestamp, and the certificate identifier generation counter;

wherein the leading zero is a one-byte value, the instance index value is a one-byte value, the instance deployment time is an eight-byte value, the current certificate identifier generation timestamp is an eight-byte value, and the certificate identifier generation counter is a two-byte value, and issuing the public key certificate using the unique certificate identifier.

9. The media of claim 8, wherein the certificate authority server is associated with a cloud-based Public Key Infrastructure ("PKI") certification service.

10. The media of claim 9, wherein the certification service is part of an integration suite for data, application, and application Programming Interface ("API") integration.

* * * * *